UNITED STATES PATENT OFFICE.

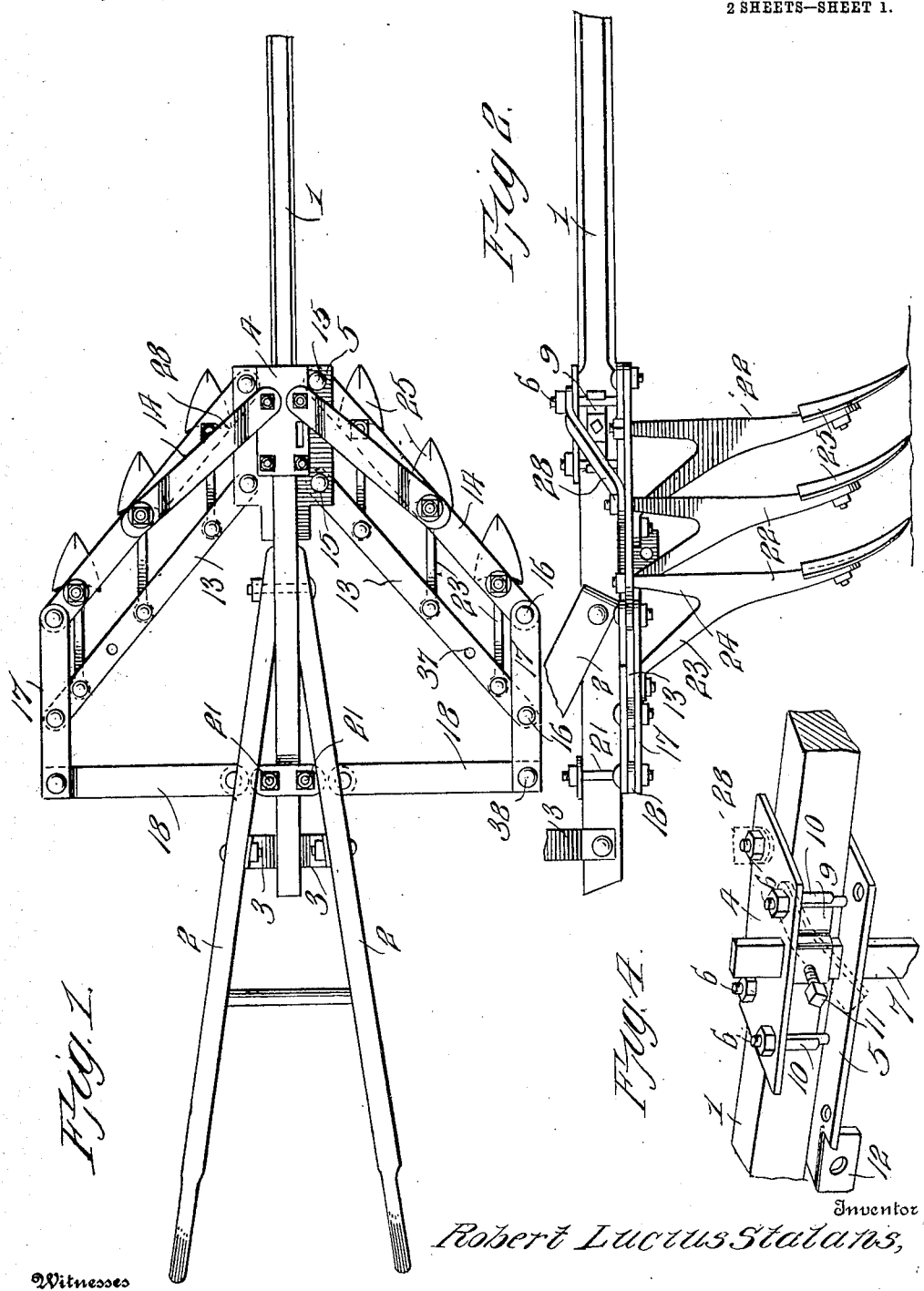

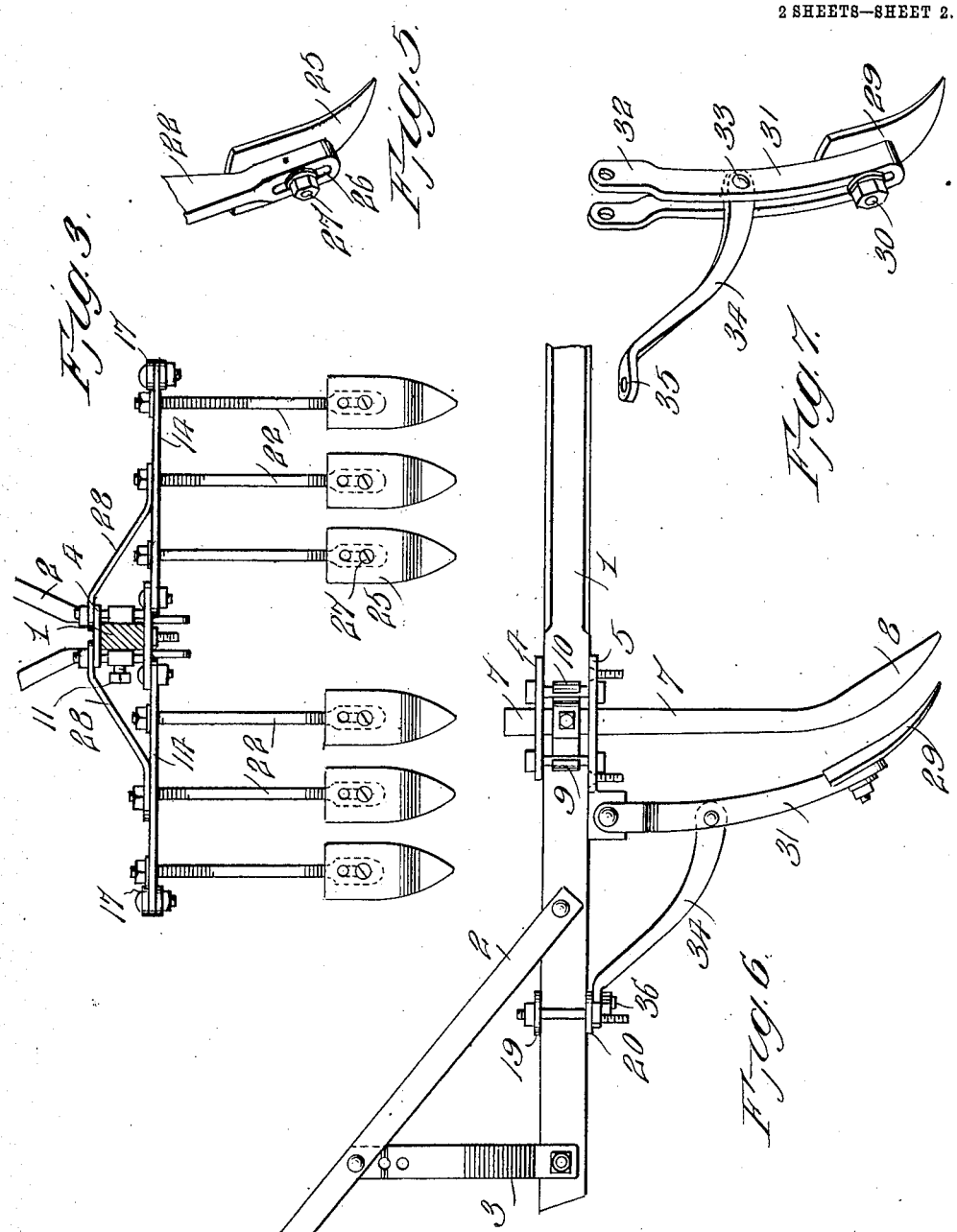

ROBERT LUCIUS STALANS, OF NEWBURG, OKLAHOMA.

ATTACHMENT FOR PLOWS, HARROWS, AND THE LIKE.

No. 916,212.  Specification of Letters Patent.  Patented March 23, 1909.

Application filed July 28, 1908. Serial No. 445,817.

*To all whom it may concern:*

Be it known that I, ROBERT LUCIUS STALANS, a citizen of the United States, residing at Newburg, in the county of Hughes and State of Oklahoma, have invented new and useful Improvements in Attachments for Plows, Harrows, and the Like, of which the following is a specification.

This invention relates to attachments designed for use on plows, harrows and the like, and the nature of the attachment will fully appear in the following description, the invention consisting in the novel construction, combination and arrangement of parts herein fully described, illustrated and claimed.

In the accompanying drawings:—Figure 1 is a plan view of the device adapted for use as a harrow. Fig. 2 is a broken side elevation of the same. Fig. 3 is a front elevation of the same omitting the beam in cross section. Fig. 4 is an enlarged detail perspective view, showing a portion of the beam and the main forward clamp. Fig. 5 is a detail perspective view of one of the harrow teeth showing a portion of one of the standards. Fig. 6 is a side elevation of the device adapted for use as a furrow opener or plow. Fig. 7 is a detail perspective view of the furrow opener together with the standard and brace.

1 designates the beam of the machine which may be of any suitable length and to the rear portion of which are connected the rearwardly diverging handles 2 which are further connected to the beam by means of braces 3.

In carrying out the invention, I employ a main forward clamp which is illustrated in Fig. 4 wherein said clamp is seen to comprise a cap plate 4 and a base plate 5 arranged respectively on top and beneath the beam 1 and secured in place thereon by means of four bolts 6, said bolts being arranged close up to the opposite sides of the beam 1 the arrangement being such that by loosening the ends of the bolts 6, the clamp may be slid backward or forward according to the desired adjustment. The plates 4 and 5 are also provided with openings for the reception of the shank 7 of a colter 8, the said shank being adjustable up and down by means of a colter clip 9 which extends horizontally between plates 4 and 5 and is provided with hooked ends 10 which engage the bolts 6 on one side of the beam and as shown in Fig. 4, a binding screw 11 passing through the clip 9 and bearing against the shank of the colter so as to hold said shank rigidly at any desired point of elevation thereby giving the desired depth of penetration to the colter 8 which is located in advance of the furrow opener to be hereinafter described. The base plate 5 is further provided at its rear end with downwardly extending lugs 12 to which the plow standard hereinafter described is connected.

Extending outward laterally from the forward clamp are parallel stays 13 and 14, one of such pair of stays being arranged at each side of the clamp as shown in plan view in Fig. 1. The parallel stays 13 and 14 are connected at their inner ends to the clamp by means of pivot bolts 15 while the outer ends of said stays are pivotally connected at 16 to end links 17. These links extend to the rear of the parallel stays where they are connected to braces 18 which extend inward toward the beam 1 and are bolted to a rear clamp consisting of top and bottom plates 19 and 20 respectively bearing against the top and bottom of the beam 1 and secured in place by bolts 21 arranged at opposite sides of said beam.

Secured to the parallel stays 13 and 14 and extending downward therefrom are series of standards 22 the upper ends of which are bifurcated or in other words each standard is provided with branches 23 and 24 which are secured at their upper ends respectively to the stays 13 and 14 as best illustrated in Fig. 1. To each of the standards 22 is secured a harrow tooth 25 and in order to provide for properly alining the harrow teeth the lower end of each standard 22 is slotted as shown at 26 to receive the bolt 27 carried by the harrow tooth 25 and the said bolt being adjustable up and down in the slot 26 as clearly shown in Fig. 5. 27 designates a pair of auxiliary braces which are connected at their inner ends to the cap plate 4 and at their outer ends to the forward stay 14 as shown in Figs. 1, 2 and 3.

The plow is provided with a bolt 30 adjustable vertically in a U-shaped or slotted standard 31 the upper end of which is forked as shown at 32, the arms of said fork being secured to the lugs 12 on the base plate 5 above referred to. Connected to the brace 31 at the point 33 is a brace 34 the rear end of which is provided with an opening 35 to receive a bolt 36 on the rear clamp as shown in Fig. 6 whereby the standard 31 is firmly held in rigid relation to the beam 1 just in rear of the colter 8.

The device is so adapted for use as a harrow in Figs. 1 and 2, in which views the plow or furrow opener and colter are omitted. To convert the device into a furrow opener, or plow, the stays 13 and 14 are disconnected from the forward clamp and the braces 18 are disconnected from the rear clamp which adapts the harrow teeth standards to be detached from the beam. The furrow opener with its standard and brace are then secured to the beam in the manner illustrated in Fig. 6 while the colter 8 is also secured to the beam as shown in the same figure. This adapts the device for use as a furrow opener. In this adaption of the device, the bolts 6 are loosened and the forward clamp is slid back far enough on the beam 1 to allow the brace 34 to be connected to the bolt 36 and any desired angle of the beam 31 may be obtained by varying the distance between the point of connection between the standard 31 and the beam or point of connection between the brace 34 and the beam.

While the device is adjusted as shown in Fig. 6, the harrow elements may be reapplied to the beam to permit the harrow and furrow opening operations to be effected at the same time in which case the braces 18 will be disconnected at their outer ends from the links 17 and connected to the rear stays 13 at the points 37, it being understood that the bolts 38 at the outer ends of the braces 18 are removed from the links 17 and inserted in the holes 37 on the rear stays 13.

I claim:—

The combination with a beam, of forward and rear clamps secured thereto, the forward clamp embodying a cap plate and base plate, bolts securing said plate to the beam, a colter clip having hooked ends in engagement with certain of said bolts, a colter having the shank thereof in engagement with said clip, and a binding screw carried by said clip and providing for the up and down adjustment of the colter shank.

In testimony whereof I affix my signature in presence of two witnesses.

ROBERT LUCIUS STALANS.

Witnesses:
    JOHN ROWELL,
    M. A. DILLECK.